United States Patent [19]
Jaworski et al.

[11] Patent Number: 6,157,164
[45] Date of Patent: Dec. 5, 2000

[54] BATTERY POWER SYSTEM

[75] Inventors: Robert K. Jaworski, Middletown; Robert J. Kakalec, Morris County; Thomas H. Kimsey, Martinsville; Keku M. Mistry, Somerset County; Thomas Denis O'Sullivan, Summit County, all of N.J.

[73] Assignee: Telcordia Technologies, Inc., Morristown, N.J.

[21] Appl. No.: 09/407,938

[22] Filed: Sep. 28, 1999

[51] Int. Cl.⁷ ................................................ H01M 10/46
[52] U.S. Cl. .............................................. 320/116; 307/66
[58] Field of Search .................................... 320/116, 117, 320/119, 121; 307/46, 65, 66

[56] References Cited

U.S. PATENT DOCUMENTS 4,349,863  9/1982  Petersen .
5,483,108  1/1996  Girard et al. .
5,932,932  8/1999  Agatsuma et al. .

Primary Examiner—Edward H. Tso
Attorney, Agent, or Firm—David A. Hey

[57] ABSTRACT

The present invention relates to battery power system configurations, particularly systems using VRLA batteries in uncontrolled environments wherein the batteries are isolated from the rectifier when the batteries are in the float mode but on line during charge and discharge. The battery power system configuration of the present invention eliminates thermal runaway because the current drawn by each battery is limited to the value determined by a constant current source. A shorted battery cell may be easily detected by observing if the voltage of the battery is lower than a specified and expected value. In addition, battery capacity is maintained by the boost provided periodically from the current source. Finally, batteries are protected against receiving excessive current and since the currents sent through the batteries match the needs of these particular batteries, the life of the batteries is increased. Moreover, in the event of AC power failure, transfer to the battery power system is immediate, in other words, the transfer time is zero.

21 Claims, 3 Drawing Sheets

//6,157,164//

BATTERY POWER SYSTEM

BACKGROUND OF THE INVENTION

Batteries are used as power sources or as backup (emergency) power sources in a number of industries, including the telecommunications industry. In general, backup batteries for telecommunications purposes need to have long life times to be ready for infrequent emergency use. One particular use of batteries is as a backup power system for telephone offices and telephone systems. These backup battery power systems provide the energy to power equipment in the event of an electrical outage or failure.

Maintaining the reliability of battery power systems, especially backup battery power systems is extremely important. However, several problems can arise in known battery power system configurations. In particular, FIG. 1 shows a typical battery power system configuration as is known in the prior art. The configuration shown in FIG. 1 includes at least one rectifier 10, that receives AC power from a standard AC power source and that converts the AC power to DC power, DC distribution means 20, that distributes the DC power to equipment 30, such as office equipment. In a telecommunications setting, the office equipment may include converter plants, ringing plants, embedded power sources, protected AC loads and the like. A secondary distribution means 40, may be included to distribute DC power for secondary purposes, such as switches, tolls or local equipment as may be required. The rectifier 10, provides current to float and to recharge the battery array 50. The rectifier 10, maintains the battery array 50, at a constant voltage, usually 52.08 volts for flooded lead acid batteries or 54.48 volts for valve regulated lead acid batteries.

The battery power system configuration shown in FIG. 1 is typical of the highly reliable configuration used in telephone offices where flooded lead acid batteries are employed in a controlled environment. However, the same configuration has been used in remote cabinets which do not have a controlled temperature environment and which employ valve regulated lead acid (VRLA) batteries. VRLA batteries are typically used in outdoor environments because they have a higher energy density than flooded lead acid batteries and thus allow a smaller cabinet to be used.

Batteries in general, but in particular VRLA batteries that are used in an uncontrolled temperature environment, exhibit four major problems when used in the configuration shown in FIG. 1. In particular, batteries are susceptible to thermal runaway, shorted cells, short life and decreased capacity over the life of the battery. One cause of these problems is that in the configuration shown in FIG. 1 there is no means for controlling the current being provided to the batteries from the rectifiers. Thermal runaway may occur because current creates heat and heat in a turn increases the current in a continuous pattern until the current increases to a level which destroys the battery. In addition thermal runaway may occur if one or more of the battery cells shorts. In such a case, the voltage increases to the remaining good battery cells since the total voltage across the battery bank is fixed. This leads to increased temperature which as noted above increases current and may result in thermal runaway. Both thermal runaway and shorted battery cells shorten the life of the battery and reduce the capacity of the battery. Thermal runaway is a catastrophic event that can result in explosions and fires.

Therefore, there is a need in the art for a new battery power system configuration, especially for use with VRLA batteries that are deployed in an uncontrolled temperature environment that overcomes the problems associated with the prior art configuration and keeps the batteries on-line without risking loss of power to the load after an AC power failure.

SUMMARY OF THE INVENTION

The present invention overcomes all of the problems associated with prior art battery power system configurations using VRLA batteries in uncontrolled environments, by providing a new battery power system configuration wherein the batteries are isolated from the rectifier when the batteries are in the float mode but on line during charge and discharge. This is accomplished without putting the load at risk. In the event of AC power failure, transfer to the battery power system is immediate, in other words, the transfer time is zero.

DESCRIPTION OF THE INVENTION

The present invention relates to a battery power system configuration which helps avoid problems such as shortened battery life and reduced capacity and catastrophic events related to thermal runaway and shorted battery cells.

Figure 2:
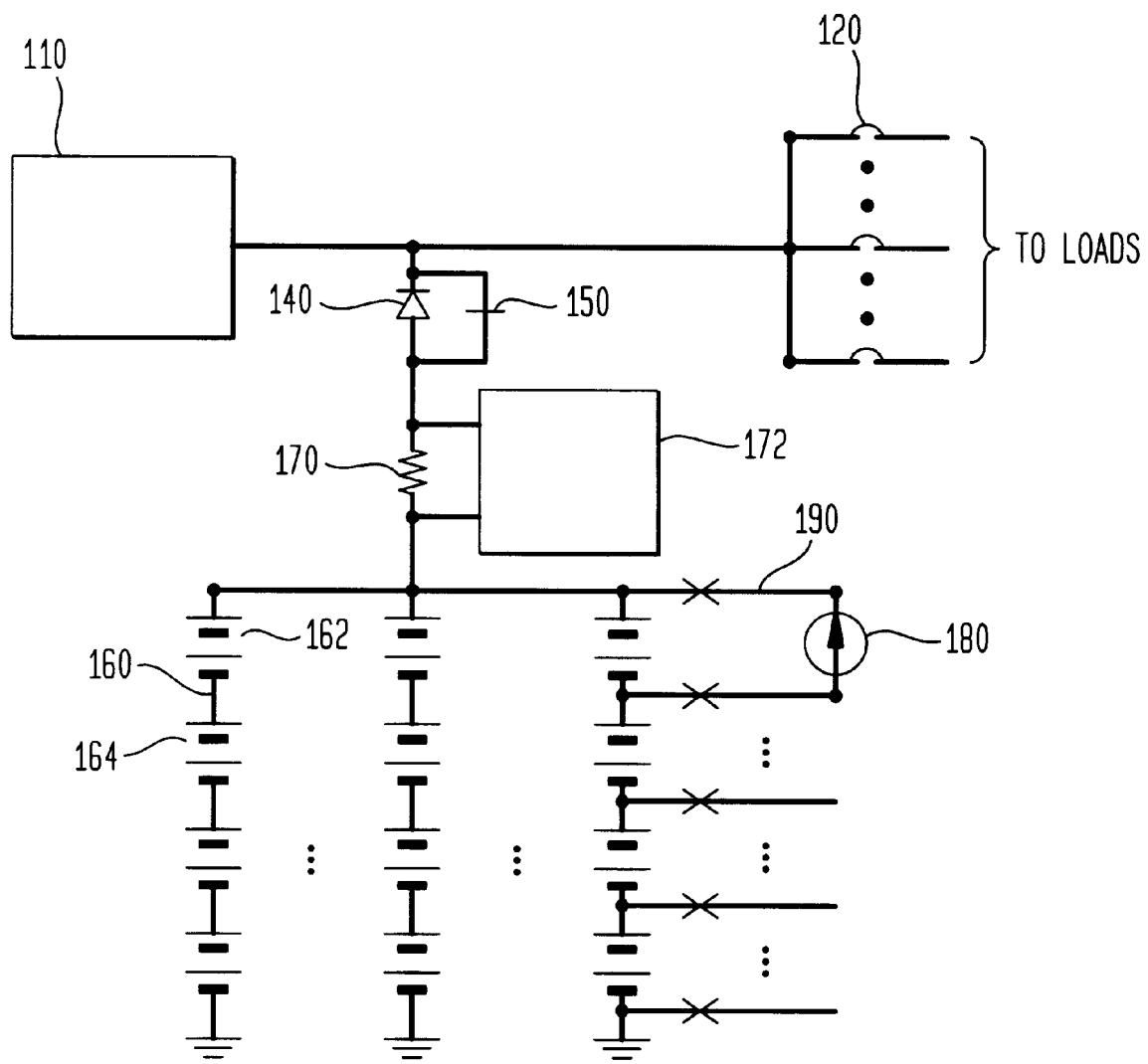
FIG. 2 is a diagrammatic representation of a battery power system configuration according to a first embodiment of the present invention.

FIG. 2 is a diagrammatic representation of a battery power system configuration according to a first embodiment of the present invention. In particular, FIG. 2 shows a configuration including at least one rectifier 110, that receives AC power from a standard AC power source and that converts the AC power to DC power, a DC distribution means 120, that distributes the DC power to equipment 130. As with the prior art configuration, secondary distribution means may be provided. The rectifier means 110, also provides power to a battery array 160, having at least one battery string 162. VRLA batteries are typically furnished in twelve volt battery blocks 164, and the battery string 162, is typically 48 volts or four battery blocks 164 for wire line applications and 24 volts or two battery blocks 162 for wireless applications. Typically several battery strings 162, are used in parallel to provide additional reserve time. In FIG. 2, three parallel battery strings 162, are shown, although any number of battery strings 162, may be used. The battery voltage is nominally 12 volts, but during float operation it is 13.62 volts. A diode 140, and contactor 150, serve to connect or isolate battery array 160, to or from the rectifier 110. A shunt 170, measures the current in and out of the battery strings 162, and control circuitry 172, is used to control the contactor contact in either a short or open position across the diode 140. A current source 180, is successively connected to each battery block 164, in each battery string 162, through a series of switches 190, to provide a constant charging current to each battery block 164.

The configuration shown in FIG. 2 operates as follows. When the power system is first connected, the contactor contact is closed, allowing current from the rectifier 110, to provide an initial charge to the battery strings 162. The shunt 170, measures the current in and out of the battery strings 162, and when the measured current decreases below a predetermined current, or after a predetermined time period, the control circuit 172, causes the contactor contact to open and the diode 140, prevents further current flow from the rectifier 110, to the battery strings 162. For example, 120 ampere hour battery will provide 15 amps of current for 8 hours. The battery would be considered fully charged if the current drops below about ½ amp. This typically occurs is less than 24 hours. Therefore, for a battery of this type, the contactor coil would open when the current drops below ½ amp or in 24 hours, whichever occurs first. With the battery strings 162, now isolated from the rectifier 110, each battery block 164, in the battery array 160, is successively charged by the current source 180, which is designed to maintain each battery block 164, at the proper voltage required by the battery chemistry to maximize battery life and performance. Further the rate of cycling the current successively to each battery block 164, is chosen to minimize corrosion, which is the major cause of loss of battery life. The charging procedure used may be specifically matched to the needs of the installed batteries. Since thermal runaway is no longer a problem; the charging can be intermittent or continuous and either constant current or constant voltage with current limit or combinations thereof. In any case, the process will increase the useful life of the batteries. For example, the charging process could use a constant voltage with current limit in place of the current source 180. An optimized solution may be found for each battery technology and will take into account the needs of that battery technology and the cost of the enhanced charging system.

If the AC power fails, then DC power is supplied to the distribution means 120, from the battery cell array 160 through the shunt 170, and diode 140, without interruption. Shunt 170, senses that the current has increased and control circuitry 172, shorts the diode 140, by closing contactor contact. Upon return of AC power, the contactor contact stays closed until shunt 170, and control circuitry 172, senses that the battery cell array 160, is properly charged, at which time the contactor coil opens and the battery cell array 160, is once again controlled by the current source 180.

The rectifier 110, distribution means 120, diode 140, contactor 150, shunt 170, control circuitry 172, and switches 190 may all be standard components known in the art. The contactor 150, may be replaced by solid state circuitry. The current source 180, may be any current source capable of providing an optimized current value to the battery cell array 160, but is preferably a constant current ring charger or CCRC. However, other sources may be used, for example, a constant voltage ring charger, a combination of the CCRC and a small voltage regulator placed across the battery strings 162, or a single constant current charger across all battery strings 162. The battery blocks 164, may be flooded lead acid batteries, or any technology; however, the configuration of the present invention is particularly applicable to solving the problems associated with the use of VRLA batteries in uncontrolled temperature environments.

In particular, the battery power system configuration of the present invention prevents thermal runaway because the current drawn by each battery is limited to the value determined by the current source. A shorted battery cell may be easily detected by observing if the voltage of the battery is lower than a specified and expected value. In addition, battery capacity is maintained by the boost provided periodically from the current source. Finally, batteries are protected against receiving excessive current and since the currents sent through the batteries match the needs of these particular batteries, the life of the batteries is increased.

Figure 1:
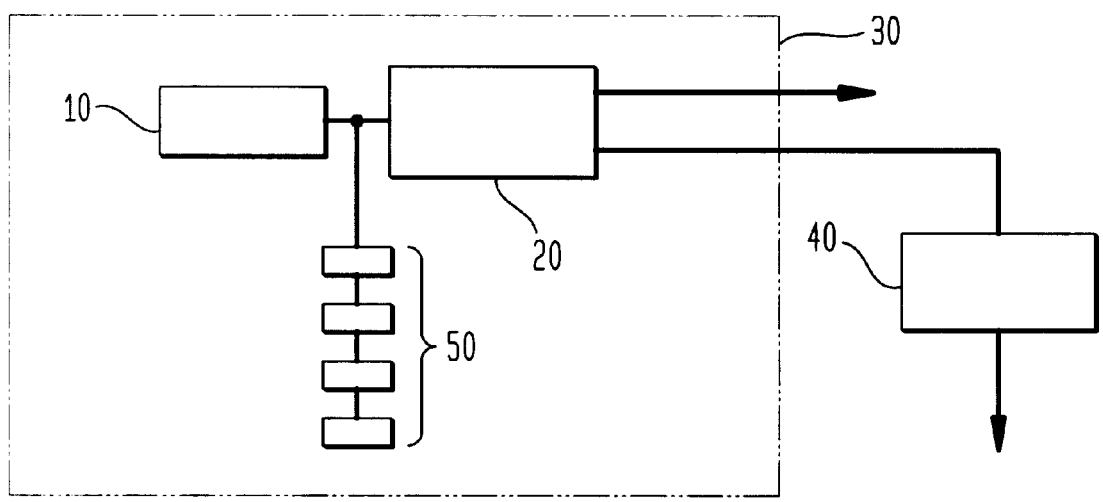
FIG. 1 is a diagrammatic representation of prior art battery power system configuration.

It should be noted that in the event of a failed control circuitry 172, and contactor 150, in the configuration shown in FIG. 2, reliability of the power system would revert to the prior art configuration shown in FIG. 1. This is because a failure of the control circuitry 172, would create a short across the diode 140, allowing the rectifier 110, to constantly float or charge the battery cell array 160, as required by the power system.

Figure 3:
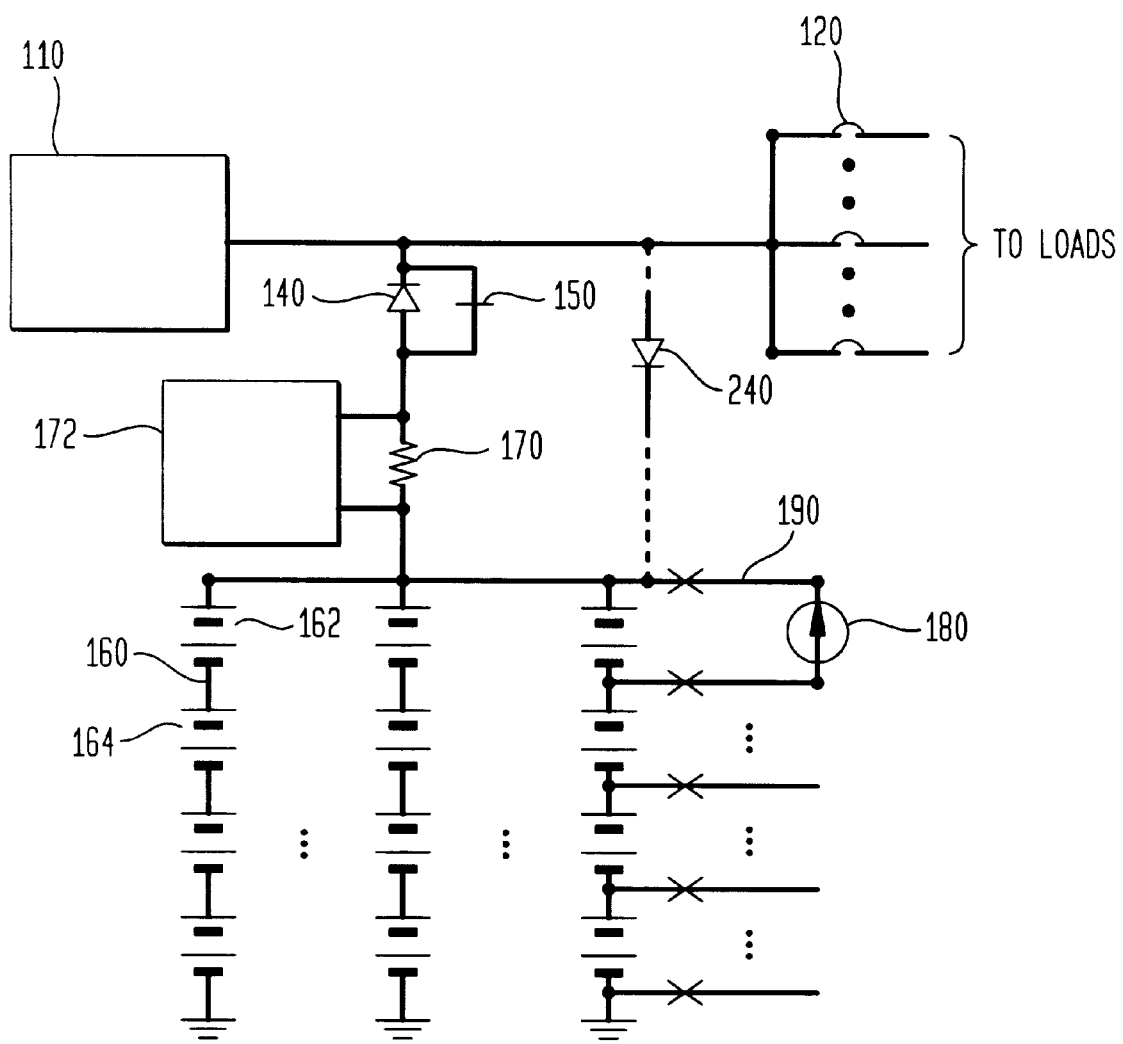
FIG. 3 is a diagrammatic representation of a battery power system configuration according to a second embodiment of the present invention.

FIG. 3 shows a second embodiment of the battery power system configuration according to the present invention, which includes all of the elements shown in FIG. 2 (which are numbered using like reference numerals), and also includes second diode 240. Second diode 240, acts as a backup should the control circuit 172, and contactor 150, fail in the open state. In particular, second diode 240, allows the battery array 160, to be charged most of the way by the rectifier 110, and then allows final and maintenance charging to be carried out by the current source 180.

As with the configuration shown in FIG. 1, if the control circuit 172, and contactor 150, fails short, the system reverts to the traditional plant and the second diode 240, does nothing. However, if the control circuit 172, and contactor 150, fails open, an extremely low probability event, then the second diode 240, provides a path to charge the battery array 160.

Like the battery power system configuration of FIG. 2, the battery power system configuration of FIG. 3 overcomes all of the problems associated with prior art configurations. In particular, the current provided to the battery array is originally provided through the diode and when the battery is almost charged, current is provided to the battery via the current source. In addition, a shorted battery cell is rapidly identified, so that a replacement may be provided, which also helps to avoid thermal runaway. Moreover, maintaining the current charge to the battery cell array helps to prolong battery life and to maintain battery capacity.

It is anticipated that other embodiments and variations of the present invention will become apparent to the skilled artisan in the light of the foregoing specification. Such embodiments and variations are intended to likewise be included within the scope of the invention as set out in the appended claims.

What is claimed is:

1. A battery power system comprising:
   at least one rectifier for receiving AC power and converting said AC power to DC power;
   at least one distribution means connected to said rectifier, said distribution means receiving said DC power and distributing said DC power;
   a battery array connected to said rectifier and to said distribution means, said battery array providing DC power to said distribution means in the event of a failure of the source for said AC power;
   a diode connected between said battery array and said distribution means, said diode allowing current to flow from said battery array to said distribution means;
   a contactor associated with said diode, said contactor allowing the flow of current from said rectifier to said battery array when in a closed position, and isolating said battery array from said rectifier when in an open position;
   a control means connected between said contactor and said battery array, said control means controlling said contactor in either a closed or open position; and
   a current source connected to said battery array, said current source providing a current to said battery array to maintain said battery array at a predetermined charge.

2. A battery power system according to claim 1, wherein said battery array is comprised of flooded lead acid batteries.

3. A battery power system according to claim 1, wherein said battery array is comprised of valve regulated lead acid batteries.

4. A battery power system according to claim 1, wherein said battery array is comprised of at least one string of batteries.

5. A battery power system according to claim 1, wherein said control means includes a shunt which measures current in and out of said battery array and control circuitry which signals said contactor to open upon sensing a predetermined current.

6. A battery power system according to claim 1, wherein said control means signals said contactor to open after a predetermined period of time.

7. A battery power system according to claim 1, wherein said current source is a constant current source.

8. A battery power system according to claim 7, wherein said constant current source is a constant current ring charger.

9. A battery power system according to claim 1, further including switch means associated with said current source, said switch means controlling the current flow from said current source to said battery array.

10. A battery power system according to claim 9, wherein said switch means controls the current flow such that battery cells within the battery array are provided with current from said current source successively.

11. A battery power system according to claim 1, further comprising a second diode connected between said battery array and said rectifier, said second diode allowing charging current to flow from said rectifier to said battery array in the event that said contactor fails in said open position.

12. A method of maintaining a battery power system comprising, said power system comprising:
- at least one rectifier for receiving AC power and converting said AC power to DC power;
- at least one distribution means connected to said rectifier, said distribution means receiving said DC power and distributing said DC power;
- a battery array connected to said rectifier and to said distribution means, said battery array providing DC power to said distribution means in the event of a failure of the source for said AC power;
- a diode connected between said battery array and said distribution means, said diode allowing current to flow from said battery array to said distribution means;
- a contactor associated with said diode, said contactor allowing the flow of current from said rectifier to said battery array when in a closed position, and isolating said battery array from said rectifier when in an open position;
- a control means connected between said contactor and said battery array, said control means controlling said contactor in either a closed or open position; and
- a current source connected to said battery array, said current source providing a current to said battery array to maintain said battery array at a predetermined charge;

said method comprising:
- initially charging said battery array by closing said contactor and allowing charging current to flow from said rectifier to said battery array;
- opening said contactor upon receiving a predetermined signal from said control means;
- maintaining the charge of said battery array by providing a maintenance charging current from said current source to said battery array.

13. A method according to claim 12, wherein said predetermined signal is provided by said control means when said control means measures a predetermined current in said battery array.

14. A method according to claim 12, wherein said predetermined signal is provided by said control means after a predetermined period of time has elapsed.

15. A method according to claim 12, wherein said battery array is comprised of flooded lead acid batteries.

16. A method according to claim 12, wherein said battery array is comprised of valve regulated lead acid batteries.

17. A method according to claim 12, wherein said battery power system further comprises a second diode connected between said battery array and said rectifier, said second diode allowing charging current to flow from said rectifier to said battery array in the event that said contactor fails in said open position.

18. A method of providing backup battery power in the event of a power failure, said method comprising:
establishing a battery power system, said power system comprising:
- at least one rectifier for receiving AC power and converting said AC power to DC power;
- at least one distribution means connected to said rectifier, said distribution means receiving said DC power and distributing said DC power;
- a battery array connected to said rectifier and to said distribution means, said battery array providing DC power to said distribution means in the event of a failure of the source for said AC power;
- a diode connected between said battery array and said distribution means, said diode allowing current to flow from said battery array to said distribution means;
- a contactor associated with said diode, said contactor allowing the flow of current from said rectifier to said battery array when in a closed position, and isolating said battery cell from said rectifier when in an open position;
- a control means connected between said contactor and said battery array, said control means controlling said contactor in either a closed or open position; and
- a current source connected to said battery array, said current source providing a current to said battery array to maintain said battery array at a predetermined charge;

charging said battery cell by closing said contactor and allowing charging current to flow from said rectifier to said battery array;

opening said contactor upon receiving a predetermined signal from said control means;

maintaining the charge of said battery array by providing a maintenance charging current from said current source to said battery array; and closing said contactor in the event of a power failure so that DC power may be provided to said distribution means from said battery array.

19. A method according to claim 18, wherein said battery cell array is comprised of flooded lead acid batteries.

20. A method according to claim 18, wherein said battery cell array is comprised of valve regulated lead acid batteries.

21. A method according to claim 18, wherein said battery power system further comprises a second diode connected between said battery array and said rectifier, said second diode allowing charging current to flow from said rectifier to said battery array in the event that said contactor fails in said open position.

* * * * *